Patented June 24, 1947

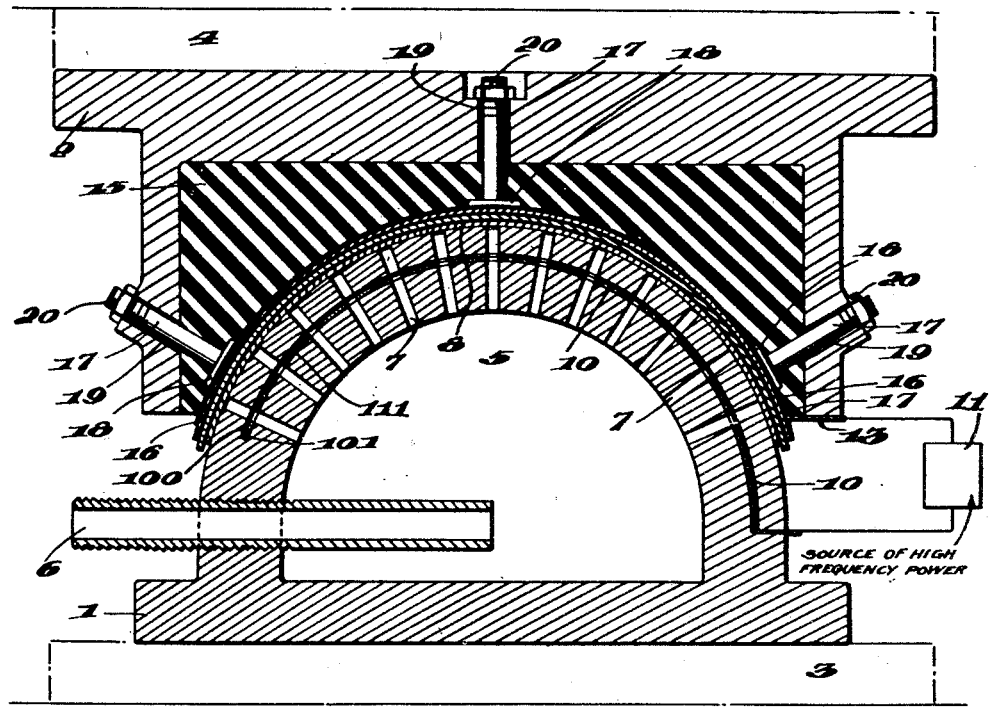
Fig. 1.
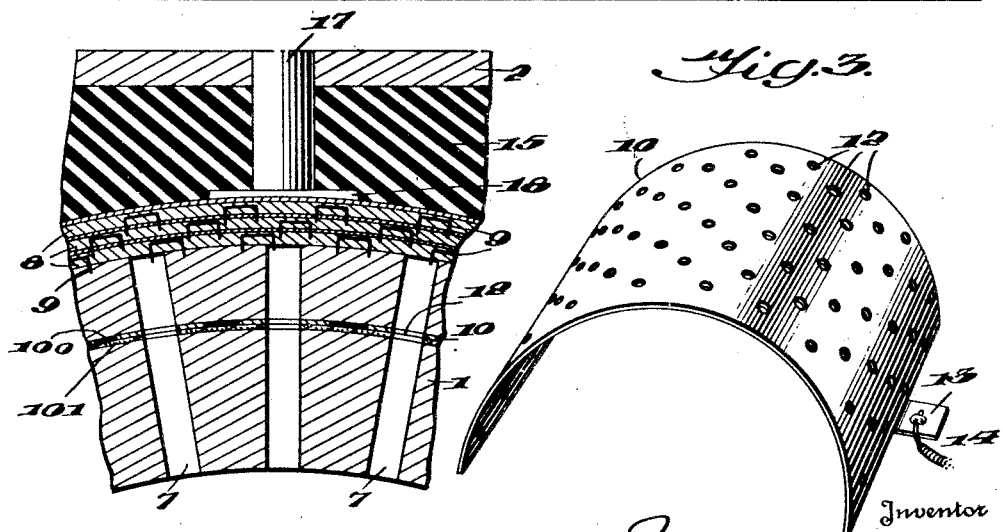
Fig. 2.
Fig. 3.
Inventor
Joseph S. Pecker
By Mason & Mason
Attorney

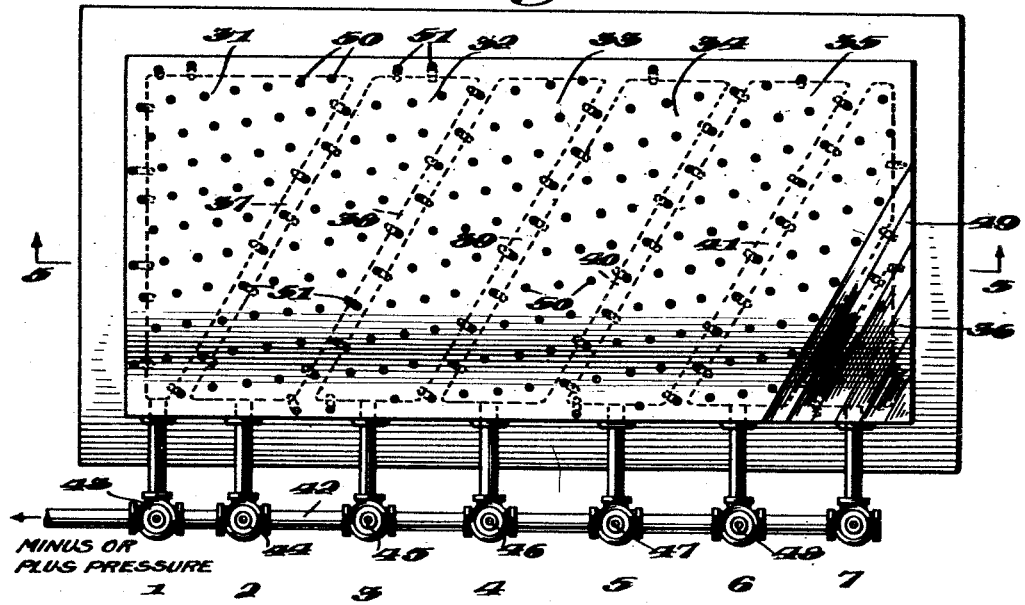
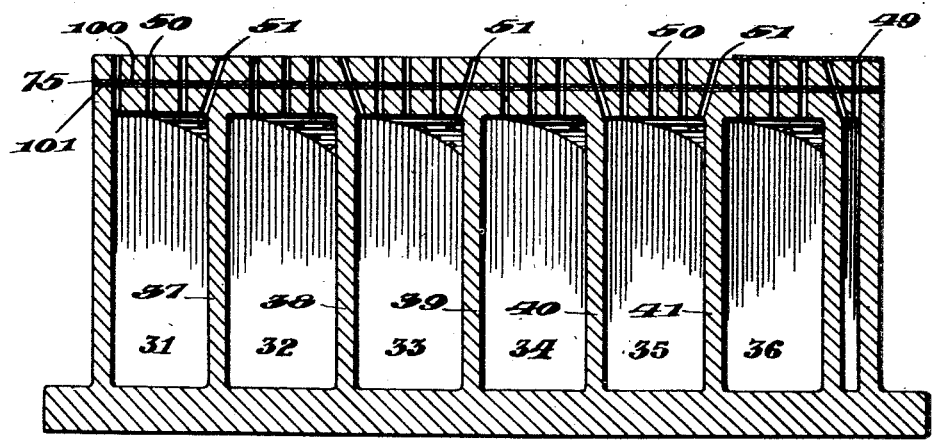
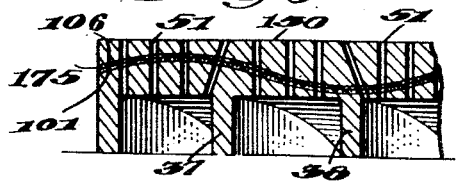

2,422,979

UNITED STATES PATENT OFFICE 2,422,979

APPARATUS FOR FABRICATING PARTS BY BONDING STRIPS OF MATERIAL

Joseph S. Pecker, Philadelphia, Pa., assignor to Machine & Tool Designing Company, Philadelphia, Pa., a corporation of Pennsylvania Application June 3, 1943, Serial No. 489,548

3 Claims. (Cl. 144—281)

This invention relates to an improved method for fabricating laminated products from plywood, or from other readily moldable materials such as paper, papier-mâché, linen, plastic sheets, Lucite, or the like.

An object of the invention is to form products of laminated sheets of wood veneer or other similar materials by a process which includes the laying of several sheets on a mandrel and the application of heat and/or pressure to the mandrel to cause the bonding together of the sheets.

Another object is to heat the sheets by causing electrical current of radio frequency to flow from one conductor to another conductor between which are located the plies, which layers have been previously covered with a bonding material, such as glue, etc., and simultaneously subjecting the layers to pressure.

A further object is to perform the foregoing steps whilst subjecting the molded material to a partial vacuum to cause the material to adhere to the forming mandrel whilst the bonding substance causes the layers to be firmly bonded to each other.

A further object of the invention is to provide a process for molding sheets of plywood or similar material which have been covered on one or both surfaces with some kind of resinous bonding material, or the like, and when the proper number of plies have been laid on the lower form or mandrel, applying pressure from the upper form to cause the superposed sheets to conform to the shape of the lower mandrel through means on the upper mandrel that will adjust itself to reasonable unevenness of the surface of the uppermost layer of material, and subsequently simultaneously applying heat for causing the plies to become bonded to each other.

A further object is to carry out the foregoing methods by improved apparatus.

Other objects will appear hereinafter.

In the drawings:

Figure 1 is a vertical sectional view through the apparatus;

Figure 2 is an enlarged detailed partial view of the structure disclosed in Figure 1;

Figure 3 is a perspective view of one of the heating plates;

Figure 4 discloses in plan a slightly modified form of the lower mold or mandrel shown in Figure 1;

Figure 5 is a vertical section taken on the line 5—5 of Figure 4 showing an aperture;

Figure 6 is a detailed vertical section, partly broken away, of a modified form of lower mandrel.

As shown in Figure 1, the apparatus comprises upper and lower mold sections 1 and 2, which are shown between the ram of a press 4 and a bed 3. The interior of the mandrel is hollow as indicated at 5, and is provided with a pipe 6 which extends through the shell of the mandrel. The outside end of this pipe may be initially connected to a source of minus pressure, or vacuum, and later connected to a source of plus pressure for a purpose which will be hereinafter explained, or two pipes, one plus and one minus, may be used. The vacuum may be on while the material is being bonded. When the bonding is completed, the vacuum is shut off and another valve opened for the admission of compressed air for forcing the bonded part off the mandrel. The reason for this is that in many instances some of the glue gets onto the surface of the mandrel, and the finished part is apt to stick to it. In prying the part off the mandrel, it may be injured; whereas, through a uniform distribution of air pressure, the part will be released without strain. This air would also act as a means of cooling the surface of the mandrel as the air passes through the apertures. The reason for this is that unless the initial bonding is started with a reasonably cool mandrel, the inside surface of the bonded material may become overly heated. Furthermore, by cooling the mandrel it is brought to a temperature where it can be readily handled by applying new layers of plies.

The numeral 7 indicates a series of symmetrically arranged apertures which extend from the interior 5 of the mandrel to the exterior shaping surface, which latter may be of the curved shape shown, or of such shape as to cause the desired configuration to be imparted to the plies. As shown in Figure 2, the several plies designated 8 may be held to each other and to the curved surface of the mandrel by staples 9. Embedded in the mandrel as shown in Figures 1 and 2, is a plate of copper or other metallic material 10, which is connected to a source of current potential 11.

The material of which the mandrel 1 is constructed consists of a molded composition that will transmit heat and which is electrically nonconductive. Of the many substances which are now on the market and which have the above characteristics, a composition is preferred which is thermo-setting, and yet which may be poured in cold to a suitable mold, and also one that develops its heat from chemical substances forming part of the material. When such a material has set, it will be found that it has a minimum amount of shrinkage and expansion so that it will reproduce a contour of the shape of the mandrel with close fidelity. Cores for internal spacing or hollows may be made of a paraffin whose melting point is lower than 300° F. As the thermo-setting temperature of this type of mandrel material will rise gradually to above 300° F. during its process of becoming set, it will gradually reach the temperature at which the paraffin core will melt. But at this time the mandrel will have become sufficiently solidified so that the aging will be completed without the collapse of the mandrel. The cores for the holes 7 and vacuum chamber 5 may be made of paraffin, or other material whose melting temperature is somewhat lower than 300° F.

The material of the mandrel develops a temperature during setting not in excess of 300° F. and as the embedded plate 10 has a melting point considerably higher than this temperature, it is unaffected by the setting of the mandrel. The mandrel, after it has cooled, is dense, hard and strong, but not too hard to take U-shaped staples such as wire staples shown at 9.

The embedded plate 10 has been provided with a series of apertures 12 which serve to position the paraffin cores, which latter make the apertures 7 of the mandrel during the molding operation. Additionally, the plate 10 has a terminal 13 to which a wire 14 may be attached, as shown in Figure 3. This wire connects with a source of high frequency potential 11.

The upper mold section 2 is provided with a hollow interior for the reception of resilient material 15, such as rubber. The underside of the block of resilient material is shaped to conform to the general shape of mandrel 1. Of similar shape and closely conforming to the block is an electrical conductive material 16 that can be made of thin sheet copper or thin mesh wire of a linked contour so that in general it will closely follow the contour of the molded plywood. This plate which is of a shape conforming to the shape of the upper surface of the mandrel, is similar in construction to plate 10, except that plate 16 lacks the apertures 12. Plate 16 is connected by an electrical conductor to the source of potential 11. Upon the closing of a suitable switch (not shown), current of radio frequency will flow from one plate to the other plate, causing the generation of heat in the laminated material 8.

The block 15 and plate 16 are held in position by bolts 17 whose heads 18 are attached to the plate 16. These bolts are adapted to slide and to adjust themselves under conditions assumed by the resilient material within the apertures 19 when the upper holder 2 is moved downwardly to bring the resilient material in contact with the bonded work. Heads 20 limit the inward movement of the bolts.

Although the cushioning means is shown as a solid rubber block, it is to be understood that other resilient structure may be substituted to form a resilient support for the plate 16.

The operation is as follows:

A plurality of sheets of material, which have been coated on one or both sides, or impregnated with synthetic resin, glue, or other cementitious material, or preferably thermo-setting resins, are laid on the upper curved portion of mandrel 1, and after being properly positioned they are stapled to each other and to the mandrel by the staples 9. A source of vacuum or minus pressure is now connected to pipe 6 to cause, by means of the apertures 7, a suction effect on the lowermost sheet to cause it to conform more accurately to the shape of the mandrel. The ram 4 is now caused to descend until the sheet 16 is in contact with the outside ply and the entire curvature is under compression, due to the rubber backing 15.

Electric current is now applied to plates 10 and 16 causing a high frequency current to flow between the plates, causing generation of heat in the layers, which are now under compression between the said plates. After the lapse of a suitable interval of time, the ram is raised. The metal staples are now removed.

In order to loosen the finished product from the mandrel, the source of minus pressure is disconnected from pipe 6, and source of plus pressure which may be from a source of cold air under pressure is connected to the pipe 6. This can be accomplished in the event the pipe 6 was connected to the suction side of an air pump, by simply connecting pipe 6 to the pressure side of the pump.

In a case where a large mandrel must be used, it has been found necessary in order to prevent the loss of vacuum in the chamber, such as 5 of Figure 1, to provide a series of chambers 31 to 36 inclusive, separated by partitions 37 to 41 inclusive, as shown in Figure 4. A pipe 42, similar to that shown at 6 in Figure 1, may be alternately connected to sources of minus and plus pressure. The pipe 42 is additionally provided with valves 43 to 48 inclusive, whereby the interior of any one of the chambers may be connected to the pipe 42, or disconnected therefrom.

In the event it is desired to place a layer only partially covering the mandrel 21, as is shown by the shaded area 49 in Figure 4, valve 48 would then be turned on so as to connect the chamber 36 with the source of minus pressure in the pipe 42, but the pipe 42 would be unconnected with the other chambers. As the strips were laid progressively on, valves 47, 46, 45, 44 and 43 would be progressively opened. This construction would therefore prevent the loss of suction from the pipe 42 by means of apertures 50 of those chambers over which no layers had been placed.

In Figure 9 the lower mandrel 150 is provided with a plate 175 similar to the plate bearing the numeral 75 in Figure 5 connected to a source of high frequency current. However, the distance between the upper or pressing surface of mandrel 150 and the plate 175 varies at different places along the surface in order to heat to a greater extent parts of sheets laid on said surface. While the showing is somewhat diagrammatic it will be understood that the raised portions of the plate 175 will cause a greater amount of heat to be developed at the places on the pressing surface under which are located the raised portions of the plate 175. For instance, two glue coated abutting edges of a piece of material are desired to be glued together at the edges. The sheet is laid on the pressing surface with the abutting glue coated edges lying immediately above one of the raised portions of the plate 175. When the current is completed to the plate 175 of Figure 9, and the upper plate, such as shown at 16 in Figure 1, the entire sheet between the plates receives heat, but the glue coated edges receive a larger proportion of heat, or in a case where the sheet is of varying thickness, the sheet is laid on the pressing surface, with the thicker portion overlying the raised portions of the plate 175, whereby the thicker portions receive a larger amount of heat.

The plates, such as plate 10 in Figure 1, are all provided with additional holes 106 which are for the purpose of locking the plate to the moldable material of the mandrel. During the construction of the mandrels the moldable material of the mandrel flows into the holes 106, thereby serving to hold or lock the embedded plate in proper position with its apertures 12 in alignment with apertures 7 during the subsequent use of the mandrel. These holes of course are in addition to the apertures 12.

Each plate has a backing of asbestos 111 so that as the plate becomes heated the heat will move toward the workpiece.

In order to secure uniform spacing of the apertures 50, some of them such as indicated at 51 in Figure 5, have been cast at an angle to the rib 40. The face of the mandrel will thus uniformly have spaced openings.

It is of course to be understood that the above description and drawings are merely illustrative and in nowise limited, and that I desire to comprehend within my invention such modifications as may be fairly included within the scope of the appended claims.

I claim:

1. In an apparatus for fabricating parts by bonding strips of material, an upper and a lower mold, said lower mold having a hollow interior and having a source of minus pressure connected thereto, a plurality of apertures extending from said interior to the molding surface of said mold, and an electrical conductor plate embedded in said lower mold, the entire area of said plate being substantially equidistantly spaced from the molding surface of said mold, a plurality of apertures in said plate, said apertures being in alignment with the apertures of said lower mold, a ram, said upper mold being connected to said ram, said upper mold having a recess, a cushion member mounted within said recess, a second electrical conductor plate, means for attaching said last named plate and cushion to said upper mold whereby when said ram and upper mold descend said last named plate may have limited cushioning movement within said recess to permit said plate to conform to the opposite curvature of said lower mold, and means for electrically connecting said plates to a source of electrical potential of radio frequency.

2. In an apparatus for fabricating parts by bonding strips of material comprising a mandrel, said mandrel having embedded therein a metallic plate, means for connecting said plate to a source of high frequency current, parts of said plate being located at different distances from the surface of the mandrel whereby to subject a work piece on said mandrel to different degrees of heat.

3. In an apparatus for fabricating parts by bonding strips of material, comprising a mandrel, an electrical conductor plate embedded in said mandrel, said plate having apertures and said mandrel having apertures in alignment with each other, and additional apertures extending through said plate and into which portions of said mandrel are embedded whereby to fixedly anchor said plate to said mandrel.

JOSEPH S. PECKER.

REFERENCES CITED

The following references are of record in the file of this patent:

UNITED STATES PATENTS

| Number | Name | Date |
| --- | --- | --- |
| 2,222,615 | Hart, Jr. | Nov. 26, 1940 |
| 1,681,455 | Anderson | Aug. 21, 1928 |
| 1,917,110 | Gay | July 4, 1933 |
| 2,317,597 | Ford | Apr. 27, 1943 |
| 1,065,681 | Harbeck | June 24, 1913 |
| 2,331,296 | Bendix | Oct. 12, 1943 |
| 2,337,250 | Klassen | Dec. 21, 1943 |
| 2,317,281 | Linquist | Apr. 20, 1943 |
| 1,439,606 | Coates | Dec. 19, 1922 |
| 2,217,652 | Quick | Oct. 8, 1940 |
| 1,612,651 | Roberts | Dec. 28, 1926 |
| 1,980,022 | Whitehouse | Nov. 6, 1935 |
| 2,252,040 | Fischer-Schmutz | Aug. 12, 1941 |
| 2,276,004 | Vidal | Mar. 10, 1942 |
| 2,109,323 | Smith | Feb. 22, 1938 |
| 2,179,968 | Thompson | Nov. 14, 1939 |
| 2,219,419 | Jacobus | Oct. 29, 1940 |
| 2,228,136 | Hart | Jan. 7, 1941 |
| 2,231,457 | Stephen | Feb. 11, 1941 |
| 2,243,506 | Mitchell | May 27, 1941 |
| 2,324,068 | Crandell | July 13, 1943 |
| 1,564,848 | Herschede | Dec. 8, 1925 |
| 2,296,781 | Farny | Sept. 22, 1942 |

FOREIGN PATENTS

| Number | Country | Date |
| --- | --- | --- |
| 443,696 | Great Britain | Mar. 4, 1936 |
| 114,239 | Australia | Nov. 13, 1941 |

OTHER REFERENCES

Page 4, R. C. A. Radio Service News, April 1944.